No. 867,120. PATENTED SEPT. 24, 1907.
F. P. FOURNET.
HANDLE FOR DAGGERS, TOOLS, AND THE LIKE.
APPLICATION FILED JULY 29, 1905.
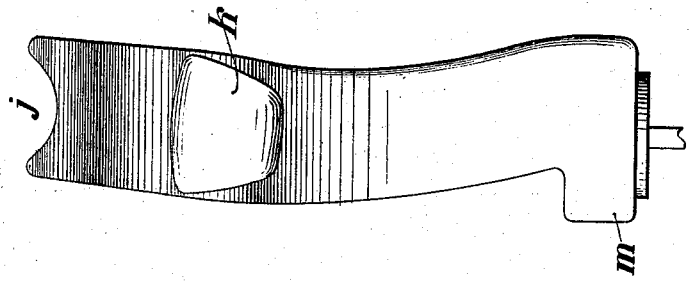
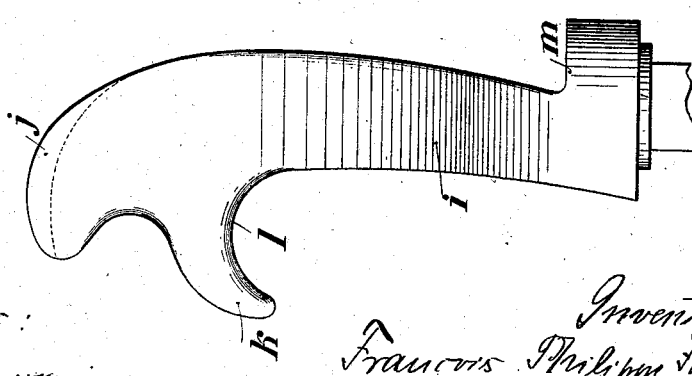

UNITED STATES PATENT OFFICE.

FRANÇOIS PHILIPPE FOURNET, OF NANCY, FRANCE.

HANDLE FOR DAGGERS, TOOLS, AND THE LIKE.

No. 867,120.  Specification of Letters Patent.  Patented Sept. 24, 1907.

Application filed July 29, 1905. Serial No. 271,858.

*To all whom it may concern:*

Be it known that I, FRANÇOIS PHILIPPE FOURNET, a citizen of the Republic of France, residing at Nancy, France, have invented certain new and useful Improvements in Handles for Daggers, Tools, and other Instruments Manipulated by Means of a Handle, of which the following is a full, clear, and exact specification.

The present invention relates to a handle for tools and the like, and has for its object to provide means whereby the handle can be held firmly in the hand without any strain owing to its particular shape, and to this end the handle is conveniently curved and shaped, and is more especially provided with a projecting horn. I also provide in some cases as for example in butcher knives or the like, a lateral projection at the end of the handle for the purpose of preventing all accident while in use.

In the accompanying drawing: Figure 1 is a side view of the new handle, and Fig. 2 is a front view.

The handle shown is more particularly adapted for an unboning butcher's knife or other similar tool in which the tip of a horn *k* is directed towards the blade, that is to say overlapping the middle finger when the handle is in the hand, and separating middle finger and forefinger. The middle part *i* of such handle which is adapted to be located in the hollow of the hand, is suitably curved, the thumb being located at the end part within a recess *j* suitably curved, while the fore-finger rests in a notch above the horn *k* the tip of which is directed downwards, so that the middle finger lies in the recess *l* formed by said horn.

The lower part of the handle is provided with a lateral projection *m* adapted to be used as an abutment for the shank and shield of the knife or tool and also to protect the hand against all accident. The shape of this handle permits of a good and firm hold, with fixed position for each finger and thus prevents all sliding, which might cause the user to cut himself. A handle, such as illustrated in Figs. 1 and 2 may also be used advantageously for stamping or similar operations, without strain for the hand, protecting the latter, the handle being used vertically as in the case of the unboning butcher's knife, the thumb on the top the fore and middle fingers separated by the horn, thus specially protecting the said fore and middle fingers. The thumb rest *j* will be suitably extended over the top in the case of a stamping handle as shown, but the thumb rest may also be provided on the side, opposite to the horn when side pressure is required, as for instance, for a butcher's knife, or when it is intended to secure a blade in the upper end instead of the lower end as shown.

Having thus described my invention what I claim is:

A handle for weapons, tools and the like, of approximately square cross-section with rounded edges having a slight curvature to correspond to the hollow of the hand when the latter is closed, a horn projecting from the handle in a direction parallel to the plane of said curvature to separate the fore-finger from the middle-finger, a thumb rest opposite the horn, and a lateral protecting projection at the end which receives the shank of the blade, substantially as described and for the purpose set forth.

In testimony whereof I affix my signature.

FRANÇOIS PHILIPPE FOURNET.

In the presence of—
VICTOR PRÈVOST,
HANSON C. COXE.